Figure 5:
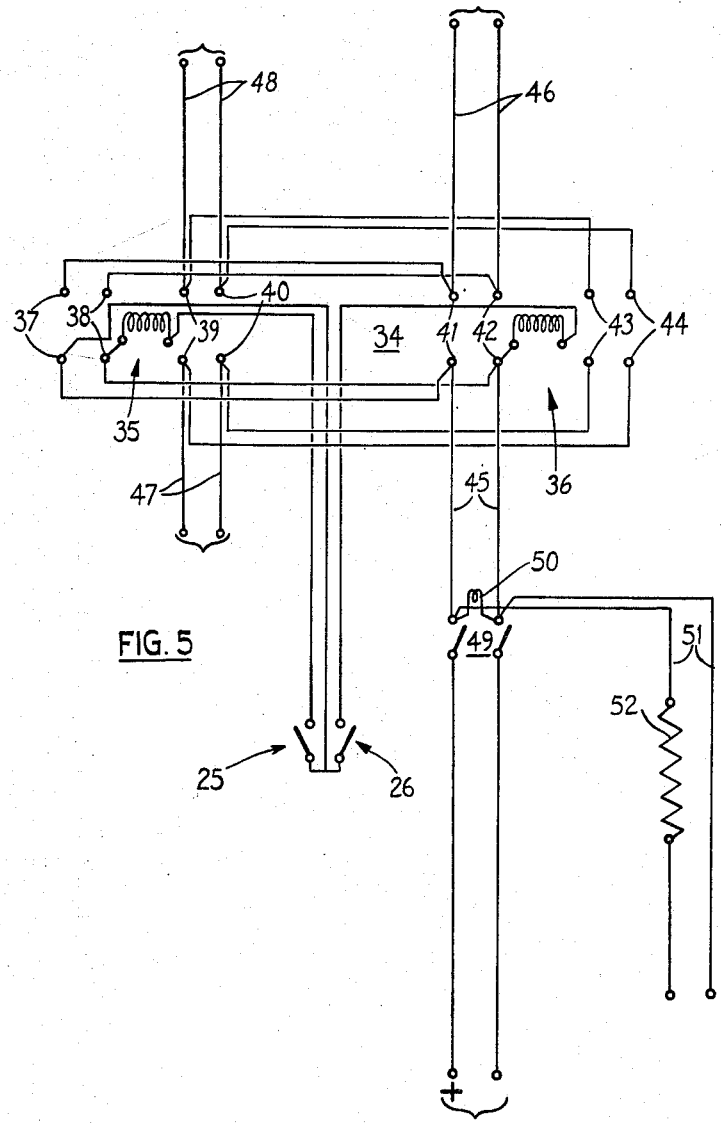

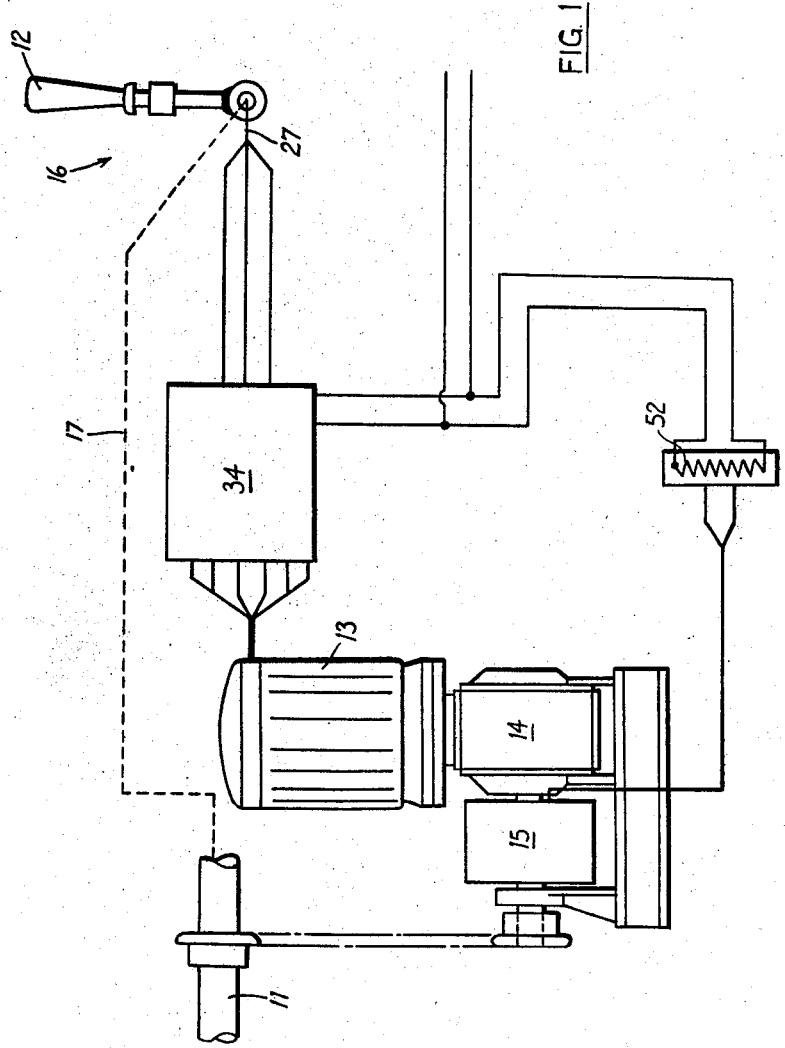

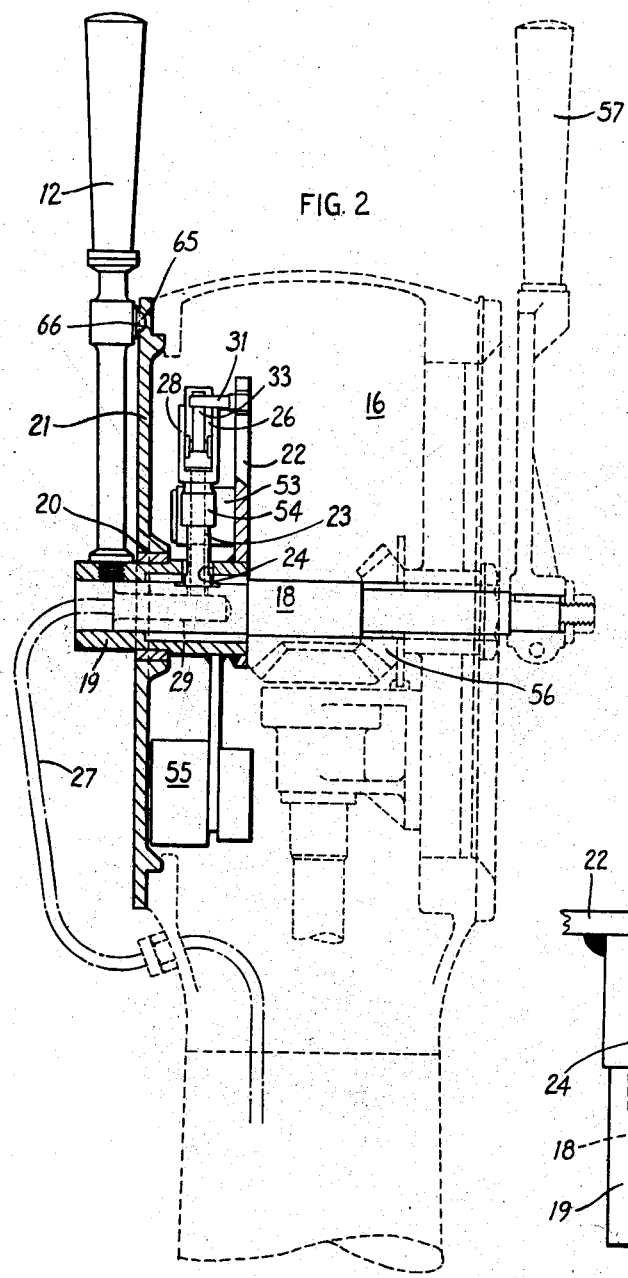
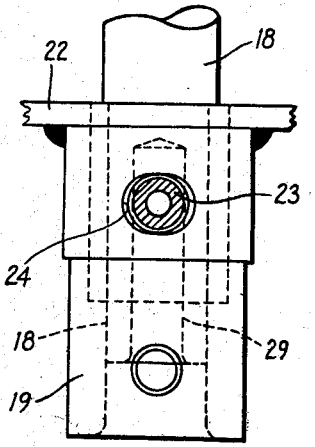

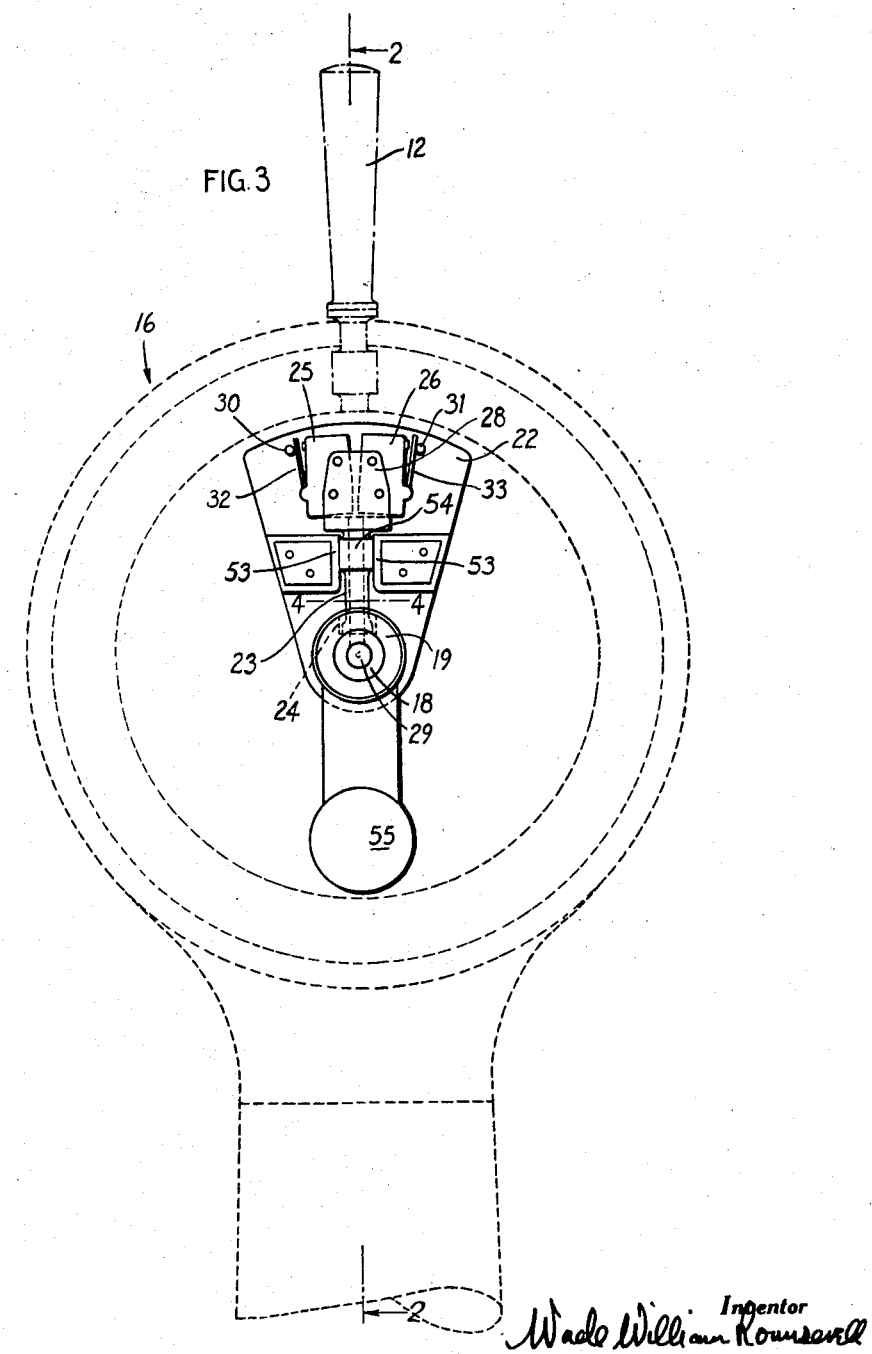

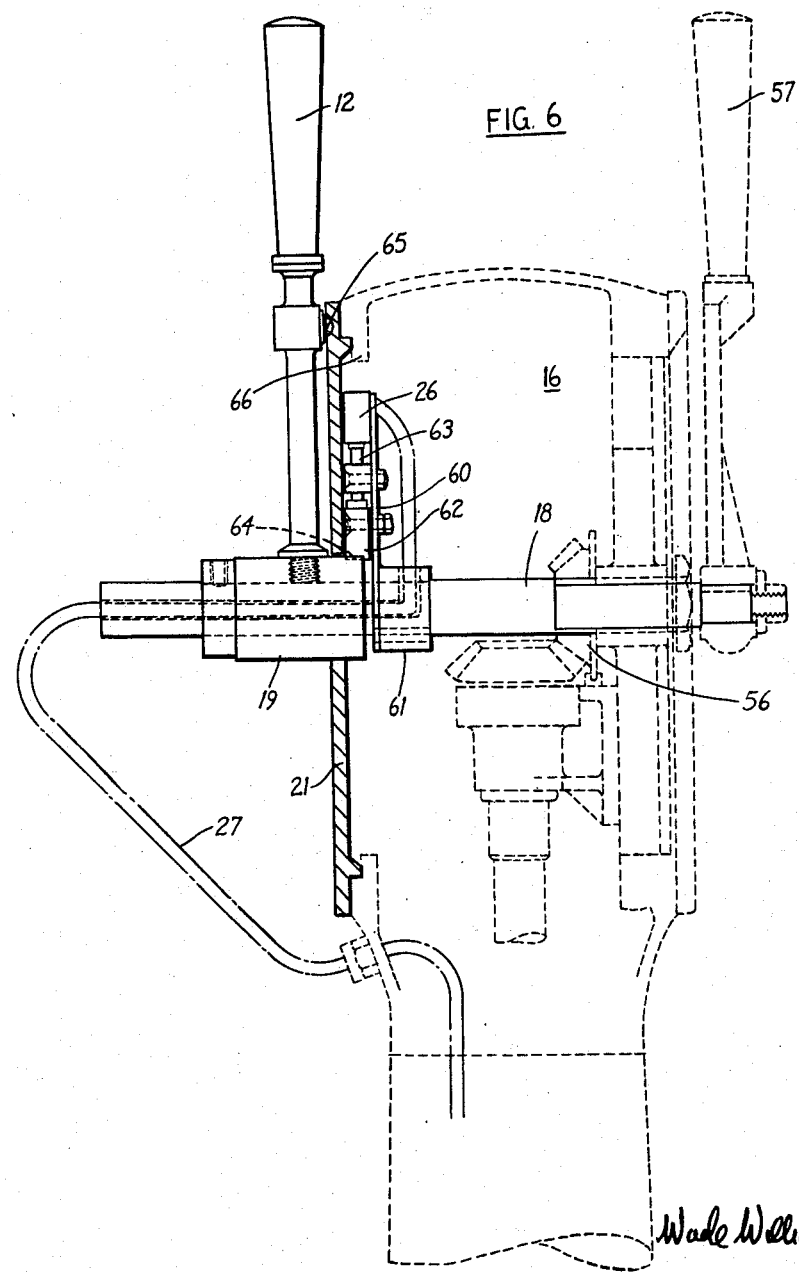

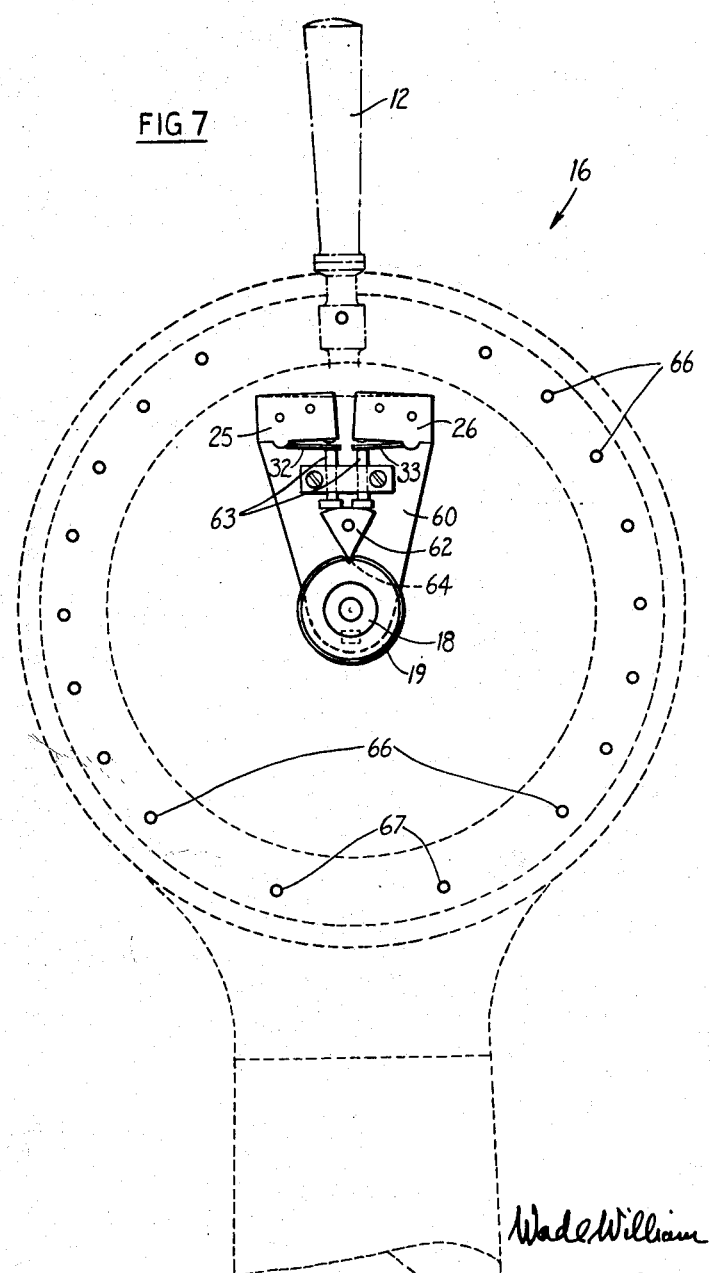

United States Patent Office 3,171,290
Patented Mar. 2, 1965

3,171,290
POWER-ASSISTED CONTROL SYSTEMS
Wade William Rounsevell, Gateshead, County Durham, England, assignor, by direct and mesne assignments, to Hydroconic Limited, London, England, a British company
Filed Feb. 20, 1961, Ser. No. 90,503
9 Claims. (Cl. 74—388)

This invention relates to manually-controlled servo-powered control systems. Its primary object is to provide an improved control system whereby electro-mechanical power assistance is available for the operation of control rods or shafting, especially in the control of prime movers or other machines from remote control stations.

The invention has particular application to the conversion of manual ship's telegraph equipment to power-assistance.

According to the present invention, an angularly movable manual control handle is provided which operates switch means controlling an electric servo-motor that is coupled through an electric clutch to the control rods or control output shaft of the machine or apparatus to be controlled, with the servo-motor providing mechanical feedback to a rotary follow-up shaft associated with the handle and switch means. The rotary follow-up shaft can also be coupled to said control rods or output shaft, the handle being either arranged to make a small or a large free angular movement with respect to the follow-up shaft in either direction from a neutral or centred setting, depending on the kind of control characteristic desired of the system.

De-energisation of the clutch, which can be automatic should the electrical power supply fail, frees the control gear for direct hand-operation unhampered by the electric motor and its associated drive train.

The invention also provides, in another aspect thereof, equipment for conversion of an existing manual ship's telegraph control to power-assistance, comprising a rotary follow-up shaft to replace the normal cross-shaft of the telegraph head, a telegraph handle mounted on the follow-up shaft for at least limited free angular movement with respect thereto, and a switching member also mounted on the follow-up shaft and associated with a pair of electric switches one or the other of which is actuated by movement of the handle in one direction or the other from a centred or neutral position with respect to the switching member and remains actuated until the handle and switching member are realigned.

The above and other features will be apparent in the following description, given by way of example, of the practical application of the invention to a ship's telegraph.

Reference will be had to the accompanying drawings, in which:

FIGURE 1 is a diagram of a telegraph control system for ship's engines,

FIGURES 2 and 3 are respectively side and front elevations of the telegraph control head, with a front plate omitted in FIGURE 3 for clarity, and FIGURE 2 partly in section on the line 2—2 of FIGURE 3, FIGURE 4 is a part plan in section on the line 4—4 of FIGURE 3, FIGURE 5 is an electrical circuit diagram for the system, and FIGURES 6 and 7 are views, corresponding to FIGURES 2 and 3, of a modified control head.

In the particular arrangement to be described with reference to FIGURES 1 to 4, the operation of a ship's propulsion engine or engines (not shown) is under the control of an output shaft 11. The movement of a telegraph operating handle 12 automatically starts rotation of a control electric motor 13, and this rotation is transmitted through reduction gearing 14 and a magnetic clutch 15 to the output shaft 11 at a position as close to the machine to be controlled as is practicable. Any movement of the handle 12 is thus converted substantially instantaneously into a corresponding movement of the output shaft. The handle 12 also has a mechanical coupling to the output shaft 11, as indicated at 17, so that in the event of electrical power failure the system reverts to direct hand-powered operation.

The handle 12 forms part of a telegraph control head 16 (FIGURES 2 to 4) which can be located at a station remote from the engine to be controlled, i.e. on the bridge of the ship, and transmits electrical control signals. A horizontal rotary follow-up shaft 18 is journalled at one end in a sleeve 19 which is rotatable in turn in a bearing 20 carried by a fixed front plate 21 of the control head 16. The sleeve 19 projects through the front plate 21 and the operating handle 12 is secured to the projecting portion by having a screw-threaded end received in a tapped hole in the sleeve. Behind the front plate 21 the sleeve 19 carries a section plate 22 welded thereto, and between this section plate and the front plate 21 there is disposed a hollow tubular carrier arm 23 that is substantially parallel with the operating handle 12. The carrier arm passes through a clearance hole 24 in the sleeve 19 and has one end screwed into the follow-up shaft 18, while at the other end it is forked and provides a mounting 28 for a pair of microswitches 25, 26. Electric leads 27 for the switches are taken into the sleeve 19 and thence by way of a counterbore 29 in the follow-up shaft 18 into the hollow carrier arm 23.

When the handle 12 is adjusted angularly in either direction, a very small amount of free travel is allowed by the clearance hole 24 after which further movement of the handle will turn the follow-up shaft 18 through the intermediary of the arm 23. During the free travel the sector plate 22 moves relatively to the arm 23 and one or other of the microswitches 25, 26 carried by the arm is operated by cooperation of one or other of two pins 30, 31 on the sector plate with switch-actuating arm 32 or 33. This transmits a signal to relay circuitry 34 (FIGURES 1 and 5) which starts the control motor 13 rotating in the direction to assist in effecting the control movement being made by the handle; the circuitry is arranged so that the motor runs in one direction upon actuation of switch 25 and in the opposite direction upon actuation of switch 26.

As shown in FIGURE 5, the relay circuitry 34 comprises two relays 35, 36 each controlling four circuit lines by making or breaking pairs of contacts 37, 38, 39, 40 or 41, 42, 43, 44. Contact pairs 37, 38, 41 and 42 are for connecting the mains supply lines 45 to a pair of lines 46 feeding the supply terminals of the motor 13, while the contact pairs 39, 40, 43, 44 are for reversing the motor by reversing the connections between the motor coils and commutator brushes through lines 47 and 48. Providing a mains switch 49 is closed, closing of one or other of the microswitches 25, 26 results in energisation of one or other of the relay coils and completion of the circuits through all four pairs of contacts of that relay.

Whenever the mains switch 49 is closed an indicator lamp 50 lights and energising current is supplied to the magnetic clutch 15 by way of lines 51 and a voltage dropping resistor 52. Therefore, whenever the motor supply is connected the clutch 15 is already engaged in preparation for providing a positive drive to the engine-controlling output shaft 11.

Since the output shaft 11 is mechanically coupled to the telegraph follow-up shaft 18, continuous movement of the handle 12 results in angular adjustment of the follow-up shaft 18 in the same direction by mechanical feedback from the control motor drive. When angular movement of the handle 12 ceases, the control motor 13 continues to run for a brief period until the follow-up shaft 18 has revolved far enough in advance of the handle for the appropriate microswitch to be thrown out of contact, deenergising the corresponding relay and breaking the motor circuit. The handle 12 in its new position is retained mid-way between the microswitches by a simple centering device consisting of rubber stops 53 on the sector plate 22 that are in engagement with opposite sides of an enlargement 54 on the arm 23. As the free movement of this handle can be restricted to very small limits the reaction of the motor to handle movement is to all intents and purposes instantaneous.

In particular cases the magnetic clutch can, if desired, be arranged for energisation only when the motor is energised. The arrangement illustrated however, in which the clutch is engaged so long as the electrical supply is connected, has the advantage of locking the control position owing to the comparatively high gear ratio employed between the motor 13 and final output shaft 11. Thus creep back is prevented but without at the same time preventing the satisfactory operation of the manual control in the event of power failure.

In the event of failure of the electrical power supply, the magnetic clutch 15 is disengaged. The handle 12 may be moved as before, but at the same instant as contact is made with a microswitch in either direction, the turning effort is taken up by the telegraph follow-up shaft 18, thus permitting the output shaft 11 to be rotated manually through the aforementioned mechanical coupling 17 without interference from the power-assistance gear.

A special feature of the equipment described is that it is particularly suited to the adaptation of existing hand-operated telegraphs to power-assistance. In FIGURES 2 and 3 the parts present in an existing hand-operated telegraph are shown in broken lines, and it will clearly be seen how conversion is effected by the fitting of the parts in full lines including the follow-up shaft 18, the handle 12, sleeve 19, sector plate 22 and arm 23 with the associated microswitches and a counterbalance weight 55. In the broken line portion of FIGURE 2 is shown the existing mechanical connection of the telegraph shaft by means of bevel gears 56. Ordinarily the existing handle 57 will be retained for use if operation by manual effort is required.

Referring now to FIGURES 6 and 7 these show a modification of the telegraph arrangement in which parts having similar functions to those in FIGURES 2 and 3 are given like reference numerals. In this modification the sleeve 19 carrying the handle 12 is free to move to any angular extent with respect to the follow-up shaft 18, the previous lost motion connection between the two through the arm 23 being no longer present. The microswitchs 25, 26 are now mounted on a sector plate 60 that is integral with a bush 61 fast on the follow-up shaft 18, and are operated through plungers 63 by a rocker cam 62 of substantially triangular shape which is likewise mounted on the sector plate. The apex of the cam 62 is engaged in a notch 64 in the circumferential surface of the sleeve 19 when the handle 12 is in a centred or neutral position relative to the sector plate 60 and microswitches.

Any movement of the handle 12 in either direction from the neutral position mentioned displaces the apex of the cam 62 from the notch 64 and causes it to ride around the circumferential surface of the sleeve 19. The consequent rocking of the cam is enough to close one or other of the microswitches 25, 26 and so set the control motor in operation in a direction to cause the follow-up shaft 18 and sector plate 60 to follow up the movement of the handle 12. This motor operation continues until the sector plate catches up with the handle 12 whereupon the cam apex returns to the notch 64 and the motor circuit is broken.

This arrangement is particularly advantageous where rapid telegraph movements are required. The handle 12 can be quickly set by the master or pilot of a ship after which he can leave the telegraph to go, for example, to the ship's side to observe the vessel's movements, in the knowledge that when the required degree of engine speed variation has been achieved the control will knock itself off. As before, the existing parts of a converted telegraph are shown in broken lines, and the existing handle 57 is available for direct manual control.

In both embodiments, the front plate 21 has a ring of dimples 66 to cooperate with a locating ball 65 on the handle 12, and pair of stops 67 to limit the handle movement.

A system such as either of those described, or a variant thereof, can be used where any prime mover, or other machine or apparatus, is controlled, e.g. from a remote control station, by a mechanical system of control shafting or rods, either rotary or of the push-pull type. Such a system gives the benefit of reduction or prevention of back-lash, permits fingertip control and ensures delicacy of adjustment. Safety is enhanced by the automatic reversion to direct hand operation in the event of an electrical failure.

There can be more than one control position in the same system without impairment of the benefits mentioned above. Furthermore the system permits of remote control from a mobile control station by provision of a portable control device having a simple plug-in electrical connection and "dead man's handle" characteristics.

I claim:

1. A ship's telegraph system for controlling ship's propulsion machinery from a remote location such as a ship's wheelhouse, comprising a telegraph head situated at said remote location, an angularly movable manual control handle on said head, an angularly movable follower member also on said head, a reversible servo motor situated near said propulsion machinery to be controlled, a control element for said propulsion machinery, driving connections between said servo motor and said control element, a permanent positive non-slip drive connection between said control element and said follower member, servo control means commanding the operation of said servo motor in response to relative angular movements of said control handle and said follower member, said control handle and follower member having a neutral positional relationship to one another in which they are in mutual alignment and the servo motor is stopped, with operative connections between the control handle and the servo control means whereby movement of the control handle out of said alignment with the follower member results in the servo motor running in the direction to move the follower member in the same direction as the control handle until the neutral relationship is regained, and a clutch in the drive between the servo motor and the machinery control element, said positive non-slip drive connection between said control element and said follower member being separate from the servo motor and clutch whereby for each angular setting of said manual control handle there is a corresponding particular control position to which said control element is driven by the servo motor said particular positions remaining the same throughout operation of the system.

2. A system as claimed in claim 1, wherein said permanent non-slip drive connection comprises a rotary follow-up which shaft is mechanically coupled to the control element and is rotatable manually to enable direct manual effort to be imparted to said control element when the clutch is disengaged.

3. A system as claimed in claim 2, wherein the control of the servo-motor is effected through relay circuitry which is energized, upon operation of switch means by movement of the handle, to connect the motor for running in one direction or the other according to the direction of handle movement, and the clutch is a magnetic clutch that is permanently energized so long as an electrical supply is switched on to render the servo operative.

4. A system as claimed in claim 3, wherein the handle is arranged for angular movement as one with the follow-up shaft except for a lost-motion connection allowing a small amount of relative movement sufficient for operation of the switch means.

5. A system as claimed in claim 1, wherein said permanent non-slip drive connection comprises a rotary follow-up shaft which is mechanically coupled to the control element, the handle is movable relatively to the follow-up shaft over a wide range of movement, the handle has a neutral or centered angular setting relative to the follow-up shaft, and movement of the handle relatively to the follow-up shaft away from this setting brings about actuation of one or other of two switches, depending on the direction of relative movement, which switches are both deactuated whenever the handle and follow-up shaft are mutually centred.

6. Equipment for conversion of a manual ship's telegraph control to power-assistance, comprising a horizontal rotary follow-up shaft to replace the normal cross-shaft of the telegraph head, a sleeve surrounding a portion of the length of said shaft and loose for rotation thereon, a manually-operable telegraph control handle secured at its lower end to said sleeve and upstanding therefrom, a switch-carrier member secured to said shaft and projecting radially therefrom, switch-operating means disposed on said sleeve alongside said switch-carrier member, a pair of electric switches mounted on said carrier member in circumferentially-spaced mutual relationship, and a switch-actuating element mounted on said carrier member in operative association with each switch and disposed in cooperative engagement with said switch-operating means on said sleeve, one of said switches being actuated when limited relative angular movement of said sleeve and said shaft takes place in one direction and the other switch likewise being actuated upon limited relative angular movement in the other direction.

7. Equipment as claimed in claim 6, wherein the switch-operating means comprises a sector plate extending radially from said sleeve, and resilient stops are mounted on said sector plate and lie on either side of said switch-carrier member to urge said sector plate and said handle to a neutral angular position relative to said carrier member in which neither switch is actuated.

8. Equipment as claimed in claim 6, wherein the carrier member extends through a clearance hole in the sleeve that defines the limits of relative angular movement.

9. Equipment as claimed in claim 6, wherein the switch-actuating element comprises a rocking cam mounted on the carrier member to rock thereon about an axis parallel to the follow-up shaft axis which cam is of substantially triangular shape with an apex that engages in a groove in the circumferential surface of the sleeve when the handle is in a neutral position and rides around said circumferential surface when the handle is moved from neutral.

References Cited by the Examiner

UNITED STATES PATENTS

| | | | |
|---|---|---|---|
| 2,302,506 | 11/42 | Richards | 200—61.42 |
| 2,370,025 | 2/45 | Edelman | 74—665 |
| 2,407,555 | 9/46 | Kettering | 318—32 |
| 2,438,061 | 3/48 | Lear | 318—31 |
| 2,470,820 | 5/49 | Hull | 318—31 |
| 2,534,436 | 12/50 | Staude | 318—2 |
| 2,590,029 | 3/52 | Nimorsky | 74—388 |
| 2,958,024 | 10/60 | Solis | 74—388 |
| 3,060,360 | 10/62 | Tomek | 318—32 |

FOREIGN PATENTS

| | | |
|---|---|---|
| 667,741 | 6/29 | France. |
| 3,917 | 2/14 | Great Britain. |

DON A. WAITE, *Primary Examiner.*

BROUGHTON G. DURHAM, *Examiner.*